United States Patent [19]
Misumi et al.

[11] 3,935,086
[45] Jan. 27, 1976

[54] ELECTRODIALYSIS PROCESS

[75] Inventors: Teruyuki Misumi; Sakae Tsushima, both of Yokohama, Japan

[73] Assignee: Asahi Kasei Kogyo Kabushiki Kaisha, Osaka, Japan

[22] Filed: Feb. 13, 1975

[21] Appl. No.: 549,738

[52] U.S. Cl............ 204/180 P; 204/296; 204/301; 260/2.1 E
[51] Int. Cl.² ...................... B01K 5/00; C08F 15/02
[58] Field of Search ............... 204/296, 180 P, 301; 260/2.1 E

[56] References Cited
UNITED STATES PATENTS

| | | | |
|---|---|---|---|
| 2,732,351 | 1/1956 | Clarke | 204/296 X |
| 2,858,319 | 10/1958 | De Bennville | 204/296 X |
| 2,960,508 | 11/1960 | Croxall et al. | 260/2.1 E X |
| 3,080,344 | 3/1963 | Walles | 260/2.1 E X |
| 3,311,572 | 3/1967 | Storey | 260/2.1 E X |
| 3,510,417 | 5/1970 | Mizutani et al. | 204/180 P |

Primary Examiner—Howard S. Williams
Assistant Examiner—A. C. Prescott
Attorney, Agent, or Firm—Cooper, Dunham, Clark, Griffin & Moran

[57] ABSTRACT

A specific class of anionic ion-exchange membranes, comprising a crosslinked vinyl imidazole polymer or copolymer film, is suitable for use in electrodialysis process by use of ion-exchange membranes of an aqueous solution containing organic contaminating electrolyte such as humic acid without organic contamination.

9 Claims, No Drawings

ELECTRODIALYSIS PROCESS

This invention relates to improved electrodialysis processes, which make it possible to carry out stable and continued electrodialysis of an aqueous solution containing one or more organic contaminating electrolytes. More particularly, this invention is concerned with prolonged electrodialysis of aqueous solutions containing organic contaminating electrolytes by the use of specific anion exchange membranes prepared from a crosslinked polymer of a vinyl imidazole monomer.

Conventional electrodialysis is carried out by passing direct current through an alternating array of cation and anion exchange membranes. As is well known, when the liquid to be treated contains an organic substance convertible to anions, e.g. humic acid, the anion exchange membranes undergo organic contamination which increases their electric resistance. As a result, the voltage requirements are too high to permit continued operation of electrodialysis. It has been proved theoretically that the organic contamination and increase in electrodialysis voltage can be avoided by using neutral membranes having no ion-exchange groups in place of the anion exchange groups. With neutral membranes are used, however, current efficiency (ratio of real transport amount to theoretical transport amount calculated from quantity of electric current) is too low to be economical.

It has now been found that specific anion exchange membranes, comprising a crosslinked polymer or copolymer of a vinyl imidazole monomer, can be used in prolonged electrodialysis of an aqueous solution containing organic contaminating electrolytes without undergoing organic contamination.

Specific anion exchange membranes used in the present invention are prepared by polymerizing a composition comprising:

1. 10 to 80 wt. parts, preferably 15 to 40 wt. parts of a vinyl imidazole monomer;
2. 3 to 50 wt. parts, preferably 5 to 30 wt. parts of a polyvinyl monomer;
3. 10 to 150 wt. parts, preferably 30 to 120 wt. parts of a non-polymerizable additive;
4. 0 to 80 wt. parts, preferably 0 to 60 wt. parts of a vinyl monomer other than said monomer (1); and
5. 0 to 2.0 wt. parts of a polymerization initiator, either in the absence or in the presence of a reinforcing material, based on 100 wt. parts of total polymerizable components (1), (2) and (4), to prepare a crosslinked polymer or copolymer in the form of a membrane and then eliminating at least 10 wt. parts of the additive (3) from said polymer or copolymer.

The vinyl imidazole monomer (1) referred to herein encompasses all compounds in which there is a vinyl group bonded to an unsubstituted or substituted imidazole ring. Examples are N-vinyl imidazole, N-vinyl-2-methyl imidazole, N-vinyl-2,4-dimethyl imidazole, N-vinyl-2-ethyl imidazole, N-vinyl-2-ethyl-4-methyl imidazole, 2-vinyl imidazole, 1-methyl-2-vinyl imidazole, and the like.

The content of the vinyl imidazole monomer (1) is 10 to 80 wt. parts based on 100 wt. parts of total polymerizable components. If it is less than 10 wt. parts, the membrane is too high in electric resistance to be used for electrodialysis. On the other hand, if it is more than 80 wt. parts, the membrane is lowered in mechanical strength and current efficiency.

The polyvinyl monomer (2) to be used in the present invention refers to a monomer having two or more polymerizable vinyl groups. Typical examples are divinyl benzene, trivinyl cyclohexane, ethylene glycol dimethacrylate, divinyl naphthalene, divinyl toluene and the like.

The content of the polyvinyl monomer (2) is 3 to 50 wt. parts based on 100 wt. parts the total polymerizable components. If it is less than 3 wt. parts, the membrane swells excessively; if it is more than 50 wt. parts, the membrane is lowered in mechanical strength.

As the non-polymerizable additive (3), there may be used any compound which can be mixed with the aforesaid compounds (1) and (2) to form a homogeneous phase. Examples of such compound are aromatic compounds such as benzene, toluene, xylene, naphthalene, etc.; alcohols such as ethanol, propanol, butanol, cyclohexanol, glycerine, etc.; ethers such as dioxane, tetrahydrofuran, ethyl ether, etc.; esters of such acids as phthalic acid, adipic acid, phosphoric acid, etc. with mono- or polyhydric alcohols with 1 to 20 carbon atoms; and polymers such as styrene dimer, poly($\alpha$-methyl styrene), polystyrene, polybutadiene, polychloroprene, etc. Said additive is composed of at least one of these compounds.

The amount of the non-polymerizable additive is 10 to 150 wt. parts based on 100 wt. parts of the total polymerizable components. If it is less than 10 wt. parts, the resistance of the membrane to organic contamination is decreased; if it is more than 150 wt. parts, mechanical strength of the membrane is lowered.

The mono-vinyl monomers other than the monomer (1) are those having vinyl groups copolymerizable with the compounds (1) and (2). They are exemplified by styrene, ethyl vinyl benzene, vinyl toluene, vinyl naphthalene, mono-chloro styrene, acrylic acid and methacrylic acid derivatives, acrylonitrile, and the like. Furthermore, vinyl pyridines such as 4-vinyl pyridine, 2-methyl-5-pyridine, etc. may be added in an amount which does not cause organic contamination.

As polymerization initiators (5), any one known in the art can be used. For example, organic peroxide catalysts such as benzoyl peroxide, lauroyl peroxide, etc., azobis-type catalysts such as azobisisobutyronitrile, and other conventionally known radical polymerization catalysts can be used. In place of the polymerization catalyst, radiant rays can be irradiated to proceed polymerization.

The reinforcing materials include polymers of at least one monomer selected from olefinic monomers such as ethylene, propylene, etc.; halogenated vinyl monomers such as vinyl chloride, vinylidene chloride, tetrafluoroethylene, etc.; acrylic monomers such as acrylic acid, methacrylic acid, etc.; styrene derivatives; acrylonitrile; and the like. Alternatively, polyvinyl alcohol, cellulose, polyamide, polyester, wool, silk, etc. can also be used. Furthermore, a mixed composition of these materials may also be used. For improvement of adhesiveness between reinforcing materials and the membranes, the reinforcing materials may be subjected to surface treatment, grafting treatment, radiation treatment, etc. The reinforcing materials can be used in the form of cloths of fibers with thickness of 0.01 to 2.0 mm, fabrics such as nets, knitted goods, unwoven fabrics, etc.

The polymerization is carried out generally at −20°C to 250°, usually at 40° to 110°C. The additives in the crosslinked polymer film prepared from polymerization of the above components are removed partially or totally (at least 10 wt. parts) therefrom after polymerization, at the same time as the alkylation or after alkylation, by extraction or evaporation.

The crosslinked polymer films thus prepared are weakly basic anion exchange membranes. They may be converted to strong basic anion exchange membranes by alkylation of tertiary amines in the imidazole rings to quaternary amines. Alkylation can be performed by conventional known methods, using dimethyl sulfate, diethyl sulfate, methyl iodide, methyl chloride, ethyl iodide, ethyl bromide, ethyl chloride, and the like. It is not necessary to quaternize all tertiary amines in the imidazole rings, but extent of quaternization is usually about 50% for the purpose of the invention.

Films of crosslinked vinyl imidazole polymers or copolymers of the present invention thus prepared have the following specific properties:

1. transport number of anions which is 0.60 or more;
2. specific electric conductivity which is $0.5 \times 10^{-3}$ to $20 \times 10^{-3}$ $\Omega^{-1}cm^{-1}$ (at 25°C, in 0.5N aqueous sodium chloride solution), preferably $2 \times 10^{-3}$ to $15 \times 10^{-3}$ $\Omega^{-1}cm^{-1}$; and
3. resistance to organic contamination which is 10 minutes or more in terms of the time needed before the electrodialysis voltage becomes twice as much as that at the start up of electrodialysis when 0.05N aqueous sodium chloride solution containing 10 ppm sodium dodecyl benzene sulfonate is subjected to electrodialysis at current density of 1.1 A/cm².

The organic contaminants which may be present in electrolyte solutions to which the present invention is applicable includes, for example organic compounds having hydrophilic groups such as carbonyl, hydroxyl, mercapto, nitrile, thiocyano, ether, carboxyl, sulfonic acid, sulfate, phosphate, etc. In particular, organic compounds having carboxylic acid, sulfonic acid, phosphate or sulfate groups exhibit conspicuous organic contamination. Typical examples of these organic compounds are soaps, alkyl benzene sulfonates, alkyl phosphate esters, higher fatty acids, humic acid, polyethylene glycols, etc. Typical electrolyte solutions which may contain these organic compounds, include sewage water, sewage treatment water, whey, milk, plating liquids, electrostatic coating liquids, and other organic electrolyte solutions.

For practicing the process of the present invention, any conventional electrodialysis cell may be used, wherein anionic and cationic exchange membranes are arranged between electrodes to divide a cell into multiple chambers, each chamber being filled with electrolyte solution. Direct current is passed through the membranes to concentrate, remove or transport ions in the solution.

The anion exchange membranes prepared according to the above procedure have excellent resistance to organic contamination as well as excellent electrochemical, mechanical and chemical properties. Accordingly, when these membranes are used in membraneous electrodialysis of an organic compound contaminated electrolyte solution, long-term continued, economical operation is feasible.

The following non-limiting Examples and Comparative Examples, wherein "parts" and "%" signify "parts by weight" and "% by weight", respectively, are given by way of example.

EXAMPLE 1

A homogeneous solution of monomers, comprising 20 parts of 1-vinyl-2-methyl imidazole, 20 parts of divinyl benzene (purity: 55%), 60 parts of styrene, 60 parts of toluene and 0.2 parts of benzoyl peroxide is charged into a glass ampoule (30 mm in diameter) and polymerization is carried out at 40°C for one day, at 60°C for one day and at 95°C for one additional day to obtain a crosslinked polymer in the form of a rod. This rod is sliced into films, each having a thickness of 0.20 mm. They are dipped in 20% acetone solution of methyl iodide at 40°C for one day to simultaneously effect alkylation and extraction of the additive. They have an electric conductivity of $3.5 \times 10^{-3}$ $\Omega^{-1}cm^{-1}$ at 250°C in sea water. The transport number of $Cl^-$ determined from the membrane potential between 0.4N-NaCl and 0.2N-NaCl aqueous solutions is 0.91. When an aqueous solution containing 0.05N-NaCl and 10 ppm sodium dodecyl benzene sulfonate is charged to cathode sides of said anion exchange membranes using a multi-compartment type electrodialysis cell to perform electrodialysis at a current density of 1.1 A/dm², resistance to organic contamination of the membranes is evaluated at 91, as measured by an organic contamination measuring instrument which measures organic contamination from the change in electrodialysis voltage as mentioned above. On the other hand, resistance to organic contamination of Aciplex CA-2 membranes (trade name: product of Asahi Kasei Kogyo Kabushiki Kaisha, Japan) is evaluated to be 3.

COMPARATIVE EXAMPLE 1

Example 1 is repeated except that 4-vinyl pyridine is used in place of 1-vinyl-2-methyl imidazole to prepare 4-vinyl pyridine type strongly basic anion exchange membranes. The specific conductivity of these membranes at 25°C in sea water is $8.5 \times 10^{-3}$ $\Omega^{-1}cm^{-1}$ and the transport number of $Cl^-$ determined from the membrane potential between 0.4N-NaCl and 0.2N-NaCl aqueous solutions is 0.93. The resistance to organic contamination is evaluated according to the same method as described in Example 1 to be 4.5.

EXAMPLE 2

A 60 mesh plain weave fabric made of 40 denier polypropylene multi-filaments is irradiated at room temperature by electron beams from an electron beam accelerator to dosage of 1.5 Mrad. Separately, a mixed monomer solution is prepared from 30 parts of 1-methyl-2-vinyl imidazole, 45 parts of divinyl benzene (purity: 55%), 25 parts of styrene, 80 parts of dibutyl phthalate and 0.3 parts of azobisisobutyronitrile. The mixed monomer solution is charged into a square stainless vessel, and a polyester film, the aforesaid polypropylene cloth and another polyester film are dipped into the solution in this order to remove air contained in the polypropylene cloth. Finally, under light pressure, polymerization is carried out while heating at 60°C for 5 hours, and at 95°C for 5 hours, whereby a crosslinked polymer film having polypropylene cloth as reinforcing material is produced. The film is alkylated with methyl chloride and then dipped in methanol to remove the additive by extraction to provide a strongly basic anionic exchange membrane. The electric conductivity of this membrane at 25°C in 0.5N aqueous sodium chloride solution is $10.5 \times 10^{-3}$ $\Omega^{-1}\text{cm}^{-1}$ The transport number of $Cl^{-1}$ is determined from membrane potential between 0.4N-NaCl and 0.2N-NaCl aqueous solutions to be 0.88. The resistance to organic contamination is measured according to the same method as in Example 1 to be 105.

EXAMPLE 3

The anionic exchange membranes prepared in Example 1 and cation exchange membranes (Aciplex CK-1: trade name; product of Ashai Kasei Kogyo Kabushiki Kaisha, Japan) are arranged alternately between anode and cathode in a cell to divide into multi-compartments to provide a multi-compartment electrodialysis cell. Sewage treatment water is passed into the cathode sides of the anionic exchange membranes (organic electrolyte = 11 ppm; inorganic electrolyte = 250 ppm) and electrodialysis is performed at a current density of 0.2 A/dm². There is no change in electrodialysis voltage even after 45 days running time.

COMPARATIVE EXAMPLE 2

Example 3 is repeated, but conventional anionic exchange membranes (Aciplex CA-2: trade name; product of Asahi Kasei Kogyo Kabushiki Kaisha, Japan) are used in place of the anion exchange membranes of the present invention. After running for about 11 days, the increase in electrodialysis voltage and due to organic contamination is so high that electrodialysis must be discontinued.

EXAMPLE 4

Various anion exchange membranes are prepared according to the same procedure as described in Example 1, by using N-vinyl imidazole, N-vinyl-2-methyl imidazole, N-vinyl-2,4-dimethyl imidazole, N-vinyl-2-ethyl imidazole, N-vinyl-2-ethyl-4-methyl imidazole, 2-vinyl imidazole and 1-methyl-2-vinyl imidazole in place of 1-vinyl-2-methyl imidazole. Organic contamination tests are performed for all of these membranes according to the procedure of Example 3. In these tests, no substantial change in electrodialysis voltage is observed after running for 45 days.

What we claim is:

1. An anionic ion-exchange membrane, comprising a film of a crosslinked vinyl imidazole polymer or copolymer, said membrane having the properties of:
    1. an anionic transport number which is 0.60 or more;
    2. a specific electric conductivity which is $0.5 \times 10^{-3}$ to $20 \times 10^{-3}$ $\Omega^{-1}\text{cm}^{-1}$ (at 25°C, in 0.5N aqueous sodium chloride solution); and
    3. a resistance to organic contamination which is 10 minutes or more in terms of the time needed before the electrodialysis voltage becomes twice as much as that at the start up of electrodialysis when 0.5N aqueous sodium chloride solution containing 10 ppm sodium dodecyl benzene sulfonate is subjected to electrodialysis at current density of 1.1 A/dm².

2. An anionic ion-exchange membrane as claimed in claim 1, consisting substantially of said crosslinked vinyl imidazole polymer or copolymer and a reinforcing material.

3. A process for producing an anionic ion-exchange membrane as claimed in claim 1, which comprises polymerizing a composition comprising:
    1. 10 to 80 wt. parts of a vinyl imidazole monomer;
    2. 3 to 50 wt. parts of a polyvinyl monomer;
    3. 10 to 150 wt. parts of a non-polymerizable additive;
    4. 0 to 80 wt. parts of a vinyl monomer other than said monomer (1); and
    5. 0 to 2.0 wt. parts of a polymerization initiator, all parts being based on 100 wt. parts of total polymerizable components (1), (2) and (4) to prepare a crosslinked polymer or copolymer in the form of a membrane, and then eliminating at least 10 wt. parts of the additive (3) from the polymer or copolymer.

4. A process as claimed in claim 3, wherein 15 to 40 wt. parts of a vinyl imidazole monomer are used in the composition.

5. A process as claimed in claim 3, wherein 5 to 30 wt. parts of a polyvinyl monomer are used in the composition.

6. A process as claimed in claim 3, wherein 30 to 120 wt. parts of a non-polymerizable additive are used in the composition.

7. A process for electrodialysis of an aqueous solution containing organic contaminating electrolytes by use of a cell wherein cationic and anionic ion-exchange membranes are placed alternately to divide said cell into multiple chambers, which comprises using an anionic ion-exchange membrane as claimed in claim 1 as an anionic ion-exchange membrane.

8. A process as in claim 3 wherein polymerization is effected in the presence of a reinforcing material.

9. A process for electrodialysis of an aqueous solution containing organic contaminating electrolytes by use of a cell wherein cationic and anionic ion-exchange membranes are placed alternately to divide said cell into multiple chambers, which comprises using an anionic ion-exchange membrane as claimed in claim 2 as an anionic ion-exchange membrane.

* * * * *